United States Patent [19]
Rosenquest, Jr.

[11] 3,930,999
[45] *Jan. 6, 1976

[54] PULSE TRANSFER THICKENING

[75] Inventor: John B. Rosenquest, Jr., New Canaan, Conn.

[73] Assignee: Dorr-Oliver Incorporated, Stamford, Conn.

[ * ] Notice: The portion of the term of this patent subsequent to June 11, 1991, has been disclaimed.

[22] Filed: Dec. 12, 1973

[21] Appl. No.: 426,661

[52] U.S. Cl. .............................................. 210/19
[51] Int. Cl.² ........................................ B01D 17/00
[58] Field of Search ........................... 209/455–457, 209/490; 210/19, 258, 523, 416; 417/395

[56] References Cited
UNITED STATES PATENTS

| | | | |
|---|---|---|---|
| 2,383,193 | 8/1945 | Herbert | 417/395 |
| 2,673,525 | 3/1954 | Lucas | 417/395 |
| 2,932,552 | 4/1960 | Weiss et al. | 210/19 |
| 2,958,655 | 11/1960 | Brown | 210/19 |
| 3,600,305 | 8/1971 | Edgerton | 210/19 |
| 3,785,969 | 1/1974 | Molls et al. | 210/19 |
| 3,816,034 | 6/1974 | Rosenquest, Jr. | 417/395 |

Primary Examiner—Charles N. Hart
Assistant Examiner—F. F. Calvetti
Attorney, Agent, or Firm—H. M. Snyder; Burtsell J. Kearns; Theodore M. Jablon

[57] ABSTRACT

Sewage sludge of a uniformly high solids content is pumped from a primary settling tank to a digester or thickener by an air operated spring assisted diaphragm pump.

9 Claims, 3 Drawing Figures

PULSE TRANSFER THICKENING

This invention is directed to a process for obtaining improved thickening of sewage sludge in primary settling tanks.

Sludge thickening is beneficial to many sewage treatment plant processes. Thus, with higher solids content, there are fewer gallons to pump in transferring the same quantities of suspended solids from the primary settling tank to the digester. In the digester, there is then less overflow liquid to handle and heat losses and pumping costs are reduced. Further, a smaller digester tank may be used. It is also true that dewatering filters (and centrifuges) operate more efficiently when fed by a sludge of higher consistency: less filter area is required; more capacity is obtained.

The parameters of pipe size of the sludge withdrawal piping, sludge velocity, required sludge consistency (% solids) and settling tank size limitations, restrict the ability of primary settling tanks to thicken sewage sludge. For example, employing standard piping and a minimum sludge velocity of 3 ft./sec., a third parameter (flow rate) is produced, as follows:

| Pipe Diameter | Minimum Flow Rate |
|---|---|
| 4 inch | 112 gal/minute |
| 6 inch | 264 gal/minute |
| 8 inch | 470 gal/minute |
| 10 inch | 735 gal/minute |

Continuous withdrawal of sludge at this velocity and these flow rates is feasible but only when pipe diameters, clarifier diameters and flow rates are as follows; assuming 900 gal/day/sq.ft. flow to the clarifier and an 8% sludge:

| Pipe Dia. | Sewage MGD | Sludge Flow Rate | Clarifier Area in 1000 Sq.Ft. | Clarifier Diameter |
|---|---|---|---|---|
| 4 inch | 89 | 112 gal/min. | 99 | 355 ft. |
| 6 inch | 210 | 264 gal/min. | 233 | 516 ft. |
| 8 inch | 273 | 470 gal/min. | 303 | 622 ft. |
| 10 inch | 584 | 735 gal/min. | 648 | 910 ft. |

In interpreting the above results, it should be understood that, in the present state of the sewage treatment art, clarifiers generally do not exceed 400 feet in diameter. Rectangular clarifiers are generally limited to a separate sludge draw-off for a tank area no greater than 12,000 square feet, which is about equal in area to a circular clarifier 124 feet in diameter. Employing pipe of smaller diameter would permit lower flow rates and smaller clarifiers, but use of such smaller pipes is contrary to standard practice since smaller pipes are considered vulnerable to plugging. Many state standards require a minimum of 6 inches or 8 inches diameters for primary sludge piping.

Typically, sludge accumulates (for each million gallons a day of sewage, MGD) at a rate equal to 2900 gallons of 5% sludge. At 8% consistency this is reduced to 1812 gallons of sludge. 1812 gallons per day is only 1.26 gallons per minute on a continuous basis. At 900 gal/day/square foot (the overflow rate) 1 MGD requires 1110 square feet of clarifier area. It is not possible to satisfy all of the above parameters on a continuous basis.

The practical solution to this problem over the years has been to employ intermittent rather than continuous sludge pumping whereby the parameters are met by pumping the sludge perhaps every thirty minutes, or at longer intervals. The difficulty with this system is that the sludge becomes appreciably thinner the longer the pumping continues. In one instance, the sludge density drops from 8% to 6% during a pumping cycle of twenty minutes. In most less sophisticated systems, the drop is more severe.

Accordingly, there is a real need for a practical method of withdrawing sludge from primary settling tanks at a rate essentially matching the settling rate, which is not subject to the disadvantages noted above.

It is an object of this invention to provide an improved method for transferring sewage sludge from a settling tank to a thickener, digester or dewatering device.

It is a further object of this invention, in the treatment of sewage sludge, to transfer from a settling tank to a thickener or digester, a sludge having a relatively uniform high solids content.

Other objects and advantages of this invention will in part be obvious and will in part appear hereinafter. For a better understanding of the nature and objects of the invention reference should be had to the following detailed description and drawing, in which.

Generally speaking, this invention is directed to a process for transferring sludge from a settling tank to a thickener or digester in pulses of relatively short duration. Each pulse involves the transfer of a relatively small volume of sludge at a rather high velocity.

More specifically, the present invention involves obtaining improved thickening of sewage sludge in a settling tank or clarifier by providing high velocity pulsed discharges of sludge from the settling tank wherein from 1 to about 20 pulses per minute and preferably, from 1 to 10 pulses per minute, are employed and each pulse has a duration of the order of ½ to 1 second; peak sludge velocity being at least 2.5 ft./sec.

The pulsed type of discharge, where the pulses are of such short duration, is not suitable for centrifugal type pumps which are better operated on a continuous basis because the drive motor is soon severely damaged by such stop and start operation. The plunger type pump, which does have a pulsed type of discharge, nevertheless does not provide the relatively high velocity discharge required in this service. A pump having the necessary characteristics is the air-operated diaphragm pump with spring assist fully disclosed in my co-pending application Ser. No. 123,652 for "Improvements in Diaphragm Pumps and Actuating Systems Therefor", filed Mar. 12, 1971; now U.S. Pat. No. 3,816,034, issued May 22, 1973. The normal operation of this pump results in a pulsed discharge having a relatively high velocity. The number of pulses per unit of time may readily be regulated to meet the required volume of discharge.

Figure 1:
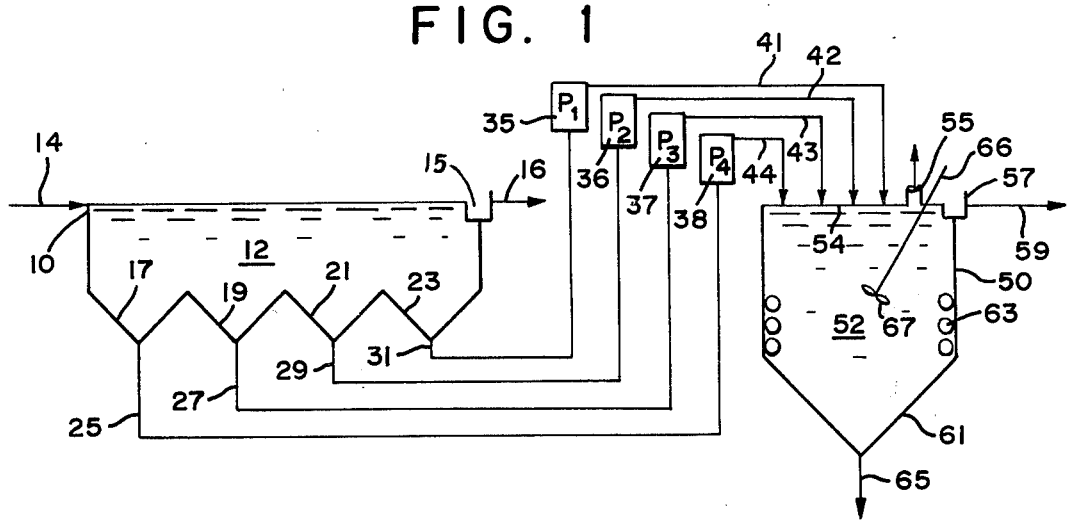
FIG. 1 is a schematic view of apparatus arranged to carry out the process of the invention.

Referring now to FIG. 1 of the drawing, a settling tank 10 is shown holding a body of sewage waste water 12. A feed conduit 14 is provided to the settling tank 10 and an overflow trough 15 is situated in the wall of the settling tank from which a relatively clear effluent is discharged through an outlet conduit 16. The bottom of the settling tank 10 is formed as a series of hoppers 17, 19, 21, 23 having sloping sides into which the sludge settles. Each of these hoppers is provided with a discharge conduit 25, 27, 29, 31 at the lower end thereof. Pumps 35, 36, 37 and 38 are each located in one of the aforesaid discharge conduits to pump the sludge through digester feed conduits 41, 42, 43, 44 to the digester 50. The digester 50 is conventional having a cover 54, a gas discharge port 55 and an overflow trough from which a relatively clear effluent is discharged through conduit 59. A hopper-type bottom 61 is provided so that the thick sludge settles toward the lowest point of the hopper for discharge through the sludge outlet conduit 65. The sludge 52 in the digester 50 is heated by means of the heating coils 63 and may be mixed by the agitator 66.

Figure 2:
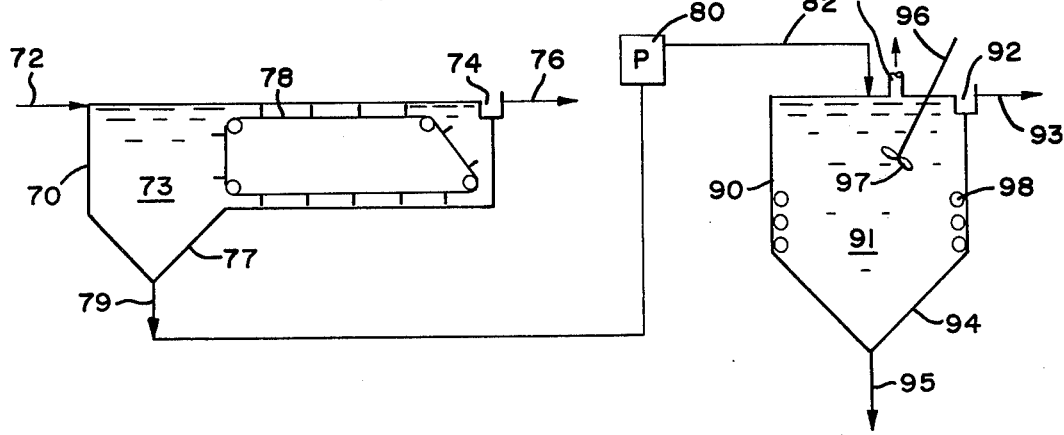
FIG. 2 is a view in section of a different form of settling tank which may be used in the process of the invention.

The apparatus shown in FIG. 2 includes a settling tank or primary clarifier 70, of rectangular configuration in plan, holding a body of waste water 73. The settling tank 70 is provided with feed conduit 72, an overflow trough 74 and an outlet conduit 76. The bottom of the tank has a single hopper 77 at one end thereof to receive the sludge. A cross-collector 78 is located in tank 70 to rake the sludge toward the hopper 77. Discharge conduit 79 is provided at the lower end of hopper 77 to conduct the sludge to the digester 90 under the influence of pump 80. The digester 90 is similar in all respects to the digester illustrated in FIG. 1.

Figure 3:
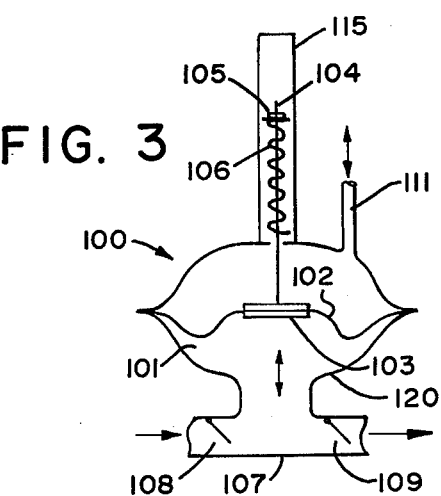
FIG. 3 is a view in section of an air-actuated spring assisted diaphragm pump suitable for use in the process of the invention.

In FIG. 3 an air-operated spring assist diaphragm pump 100 is illustrated having a pump body 120 within which there is a pump chamber 101 bisected by the flexible diaphragm 102. An air conduit 111 is provided having access to the pump chamber 101 for pressurizing the upper side of the diaphragm 102. The diaphragm 102 is secured at its center to the rod 104 by the connecting members 103. The rod 104 extends out of the pump chamber 101 into the spring tube 115 which is sealed to the pump body 120. The rod 104 is encircled by a coil spring 106 which is positioned between the stop member 105 secured to the rod 104 and the pump body 120. A connecting conduit 107 has an inlet valve 108 and an outlet valve 109 positioned therein and is in communication with the pump chamber 101 at the lower side of the diaphragm 102. The operation of the diaphragm pump is readily understood from inspection of FIG. 3. With the pump chamber 101 filled with fluid and the diaphragm in a raised position, air under pressure is admitted into the upper portion of pump chamber 101 through air conduit 111. An air pressure of 100 psi assures constant peak velocities on the discharge stroke. The air pressure forces the diaphragm 102 downward against the fluid in the lower portion of pump chamber 101 and this fluid flows into the connecting conduit 107. This flow closes valve 108 and opens valve 109 and the fluid is thus pumped to the right as seen in FIG. 3. It will be noted that this pumping stroke carries rod 104 downwardly with the diaphragm and the stop member 105 on rod 104 compresses the spring 106 against the pump body 120. With the diaphragm at its lowest point of travel and the spring 106 fully compressed, the air pressure in the upper portion of pump chamber 101 is released through conduit 111 and the diaphragm 102 begins to move upwardly under the influence of spring 106. The fluid in connecting conduit 107 flows into the pump chamber and valve 108 opens while valve 109 closes. This, then, is the suction stroke of the pump and fluid flows from the left as viewed in FIG. 3 into the lower portion of the pump chamber 101. Spring 106 assures rapid filling at good velocities.

At the beginning of the suction stroke, spring 106 is at its maximum compression and diaphragm 102 has the least amount of area in contact with the sludge. This creates a maximum pressure per unit area lifting force to be applied, greater than atmospheric pressure so that, neglecting minimal entrance losses, virtually the full effect of atmospheric pressure plus the static suction head force the sludge into the pump chamber.

Ideally, the sludge would be drawn out of the settling tank at the same rate that it accumulates with only the sludge from the bottom of the sludge blanket being pumped. When the parameters of minimum velocity, pipe diameter and draw-off rate equal to the accumulation are taken into consideration, it is found that these necessary conditions can be met only by intermittent pumping and the shorter the cycle, the less dilute the sludge becomes.

For the purpose of illustrating the advantages of the invention, the following Examples are offered:

EXAMPLE I

A conventional 300 ft. by 40 ft. rectangular primary settling tank with four sludge hoppers (see FIG. 1) produces 8 gallons of 8% sludge per hopper per minute. Four air-operated spring assist diaphragm pumps (see FIG. 3) operating with 100 psi air are employed. Each pump delivers 3.8 gallons per stroke and executes 1 cycle per minute. Each stroke takes 1½ seconds, ¾ second for suction and ¾ second for discharge. Peak sludge velocity exceeded 2.5 ft./sec. The sludge consistency is stable in the range 7.5 – 8%.

EXAMPLE II

Conditions of Example I are repeated except that there is a cross-collector in the settling tank and only one hopper with a single air operated diaphragm pump of the type described above for pumping the sludge. The pump operates at four strokes per minute pumping 15 gallons per minute. With each stroke taking 1½ seconds, the pump operates only 6 seconds out of each minute. Peak sludge velocity exceeded 2.5 ft./sec. Sludge consistency in this instance is stable in the range 7.5 – 8%.

The process of the invention is thus shown to be capable of delivering from a primary settling tank a sludge of consistently high solids content.

Although the present invention has been described in connection with preferred embodiments, it is to be understood that modifications may be resorted to without departing from the spirit and scope of the invention as those skilled in the art will readily understand. Such modifications and variations are considered to be within the purview and scope of the invention and appended claims.

I claim:

1. A method for obtaining improved thickening of sewage sludge in a primary settling tank which comprises regular pulsed discharge of the thickened sludge from the primary settling tank, wherein from 1 to 20 discharge pulses per minute are employed, each pulse imparting to the sludge a peak velocity of at least 2.5 feet per second.

2. The method of claim 1 wherein each pulse has a duration of from about ½ to 1 second.

3. The method of claim 1 wherein each pulse has a duration of about ¾ of a second.

4. The method of claim 1 wherein from 1 to 10 discharge pulses per minute are employed.

5. The method of claim 4 wherein each pulse has a duration of from about ½ to 1 second.

6. The method of claim 4 wherein each pulse has a duration of about ¾ of a second.

7. A system for obtaining improved thickening of sewage sludge comprising a primary settling tank and a digester or thickener, an air operated spring assisted diaphragm pump located in the discharge conduit connecting said settling tank to said digester or thickener, said pump providing pulsed discharge of said sludge, each discharge pulse having a time duration of from ½ to 1 second and imparting a peak velocity to the sludge of at least 2.5 feet per second.

8. The system of claim 7 wherein from 1 to 20 pulses per minute are provided by said pump and each pulse has a time duration of about ¾ of a second.

9. The system of claim 8 wherein from 1 to 10 pulses per minute are provided by said pump.

* * * * *